INVENTOR.
Justin J. Wetzler

June 26, 1962 J. J. WETZLER 3,040,473
APPARATUS AND METHOD FOR MAKING A MATTRESS STRUCTURE
Filed Sept. 22, 1960 6 Sheets-Sheet 5

INVENTOR.
Justin J. Wetzler
BY:
Olson & Trexler
attys.

United States Patent Office 3,040,473
Patented June 26, 1962

3,040,473
APPARATUS AND METHOD FOR MAKING A MATTRESS STRUCTURE
Justin J. Wetzler, Evanston, Ill., assignor to The Englander Company, Inc., Chicago, Ill., a corporation of Delaware
Filed Sept. 22, 1960, Ser. No. 57,833
9 Claims. (Cl. 45—138)

This invention relates to a mattress structure and to a method and an apparatus for making the same. Specifically, the invention pertains to methods and structures for joining together parts of a mattress cover or ticking assembled around a mattress body.

This application is a continuation-in-part of my co-pending application, Serial No. 661,122, filed May 23, 1957, now Patent No. 2,973,526 issued March 7, 1961, and entitled "Mattress Structure." In particular, this application is directed to the non-elected species of the parent application.

Tickings or covers of conventional mattresses are made of parts joined by one of several methods described hereinbelow.

In better grade mattresses, the ticking or cover is made up of parts which are initially arranged around the mattress body and thereafter sewed together at the mattress edges. Specifically, the margins to be sewed together are each folded back upon themselves; the folded margins are then superposed, one on the other; a piece of tape is folded around the superposed margins; and the assembled parts are sewed together by stitching extending therethrough. A conventional roll edge machine is used for this stitching which is initiated at one point of the mattress and thereafter continued progressively around the mattress edge until the initial starting point is reached. A high grade, well tailored mattress can thus be produced, but not without difficulty, for, as the sewing of the ticking of the mattress nears completion, it is difficult to pull the ticking tight at the joint being sewed to form a tight-fitting and well tailored seam or joint all around the mattress.

Another method is followed in making cheaper mattresses. In making such mattresses, the entire ticking or mattress cover is sewed together with ordinary sewing machines in the sewing department of the factory to take the form of an envelope open at one end. The mattress body is then tucked into the envelope from this open end, and the open end is closed. It is much easier to sew the ticking with ordinary sewing machines in the sewing department, apart from the mattress body, than it is to form a seam or joint with a roll edge machine with the ticking or cover disposed around the mattress body. However, in the filling operation wherein the mattress is tucked into the envelope-shaped ticking or cover, the padding associated with the mattress body frequently becomes disarranged. In general, this method provides a lower quality structure with a less tailored and less pleasing appearance.

According to the present invention, the mattress cover or ticking is made in two halves which are assembled with the mattress body. Each half of the mattress cover or ticking can be made in the sewing department of a mattress factory with ordinary sewing machines. Assembly of the two halves of the mattress cover or ticking and the mattress body is easily accomplished without disarranging any part thereof. The opposed margins of the two halves of the cover or ticking are joined together by means of an inner and an outer tape disposed, respectively, to underlap and to overlap the margins of the opposed halves of the mattress cover or ticking. The resulting three-ply structure extending around the mattress is held together by buttons or studs extending from one of the tapes through the other tape, the ticking margin interposed between the two tapes being either pierced by or wrapped around the studs or buttons. Thus, a quality tailored mattress structure of pleasing appearance is obtained.

Other features of the present invention will become apparent from the following description and the appended claims as illustrated by the accompanying drawings showing, by way of example, methods and structures according to the present invention, and wherein:

Figures 1, 2, 3, 4, 5:
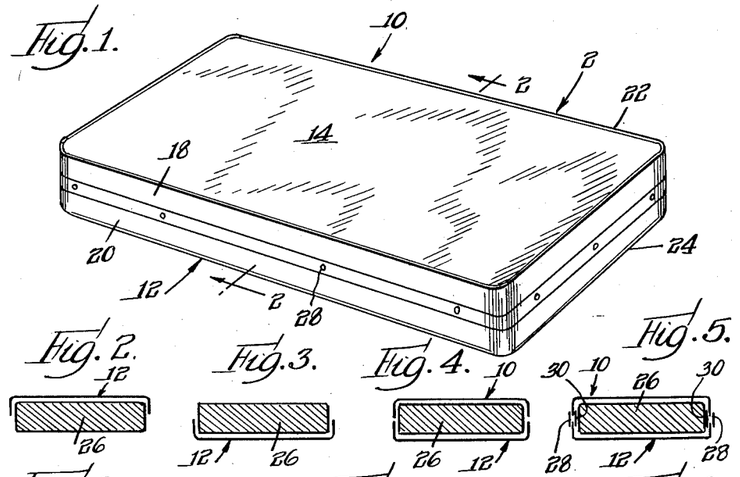
FIG. 1 is a perspective view of a mattress including a cover or ticking made up of two halves joined together.
FIG. 2 is a diagrammatic cross-sectional view on a reduced scale taken along the line 2—2 of FIG. 1 and showing an initial stage in the assembly of the mattress of FIG. 1.
FIGS. 3–5 are views similar to FIG. 2 showing subsequent stages of assembly.
Figure 6:
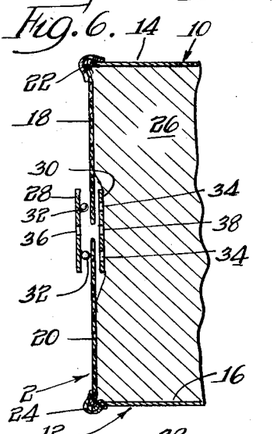
FIG. 6 is an enlarged transverse vertical cross-sectional view, with parts broken away, showing the two opposed margins of the ticking halves of the mattress of FIG. 1 before being joined together by means of an outer tape carrying buttons and an inner perforated tape.
Figure 7:
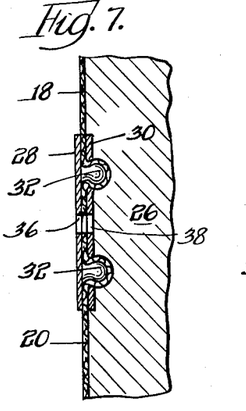
FIG. 7 is an enlarged cross-sectional view similar to FIG. 6, with parts broken away, showing the assembled joint.

Referring now to FIG. 1, a mattress generally indicated at 2 includes a cover or ticking made as two separate halves generally indicated at 10 and 12. As shown in FIGS. 1 and 6, the parts 10 and 12 of the mattress case or cover include, respectively, body sheets 14 and 16 and strips 18 and 20 defining a boxing or sidewall for the case. The edges of the strips 18 and 20 are opposed to and slightly spaced from each other. The strip 18 is joined to the body sheet 14 by any suitable desired seam 22, and the strip 20 is joined to the body sheet 16 by a seam 24.

As shown in FIGS. 2–5, the mattress 2 is assembled by first disposing one cover part 12 over the mattress body 26 (see FIG. 2), then inverting the resulting structure (see FIG. 3), depositing the other cover part 10 on the mattress body (see FIG. 4), and joining the opposed margins of the two mattress parts 10 and 12 by means of outer and inner tapes 28 and 30, respectively, overlapping and underlapping the margins of the strips 18 and 20. The tape 28 is provided with upper and lower rows of buttons 32, and the tape 30 is formed with apertures 34 aligned with the buttons 32.

The above disclosed joint between the opposed margins of the strips 18 and 20 may be effected manually. For this purpose, the cover parts 10 and 12 are assembled with the mattress body 26 as illustrated in FIGS. 2–5. Next, the tape 30 is manually introduced under the margin of the strip 18 and the tape 28 superposed on the margin of the strip 18, the upper buttons 32 being aligned with the upper apertures 34. Next, the buttons 32 are forced through the apertures 34 all around the sidewall or boxing of the mattress cover or case. Finally, the strips 18 and 20 are pulled closely together and held in this position while the lower buttons 32 are forced through the lower apertures 34. The assembly operation is then completed, yielding the finished mattress 2 shown in FIG. 1.

The seams 22 and 24 of the cover or case are easily sewed on an ordinary sewing machine in the sewing department of a mattress factory and can, without difficulty, be made with a pleasing tailored appearance. The joint between the strips 18 and 20 effected by the use of the tapes 28 and 30 is easily assembled and likewise presents a neat and attractive appearance.

Figure 8:
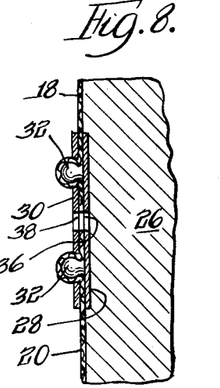
FIG. 8 is a view similar to FIG. 7 but showing an inner tape carrying buttons and an outer perforated tape.
Figure 9:
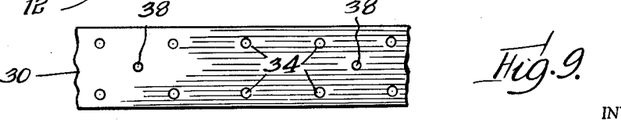
FIG. 9 is a plan view of the perforated tape shown in FIGS. 6–8.
Figure 10:
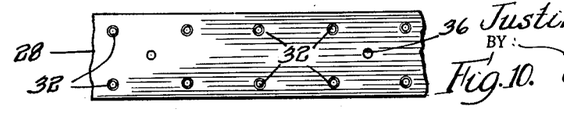
FIG. 10 is a plan view of the button carrying tape shown in FIGS. 6–8.

Various modifications of the joint shown in FIGS. 1 to 7 are possible. Thus, as shown in FIG. 8, the button carrying tape 28 may be placed inside the strips 18 and 20, with the buttons 32 projecting outwardly into the apertures 34 of the tape 30 which then runs along the outside of the strips 18 and 20.

Vent holes 36 and 38 may be provided, if desired, in the tapes 28 and 30. The apertures 36 and 38 are aligned as between the two tapes.

For the best results, the margins of the strips 18 and 20 should be made of stretchable material, to permit some stretching and/or expansion around the buttons 32.

Figure 16:
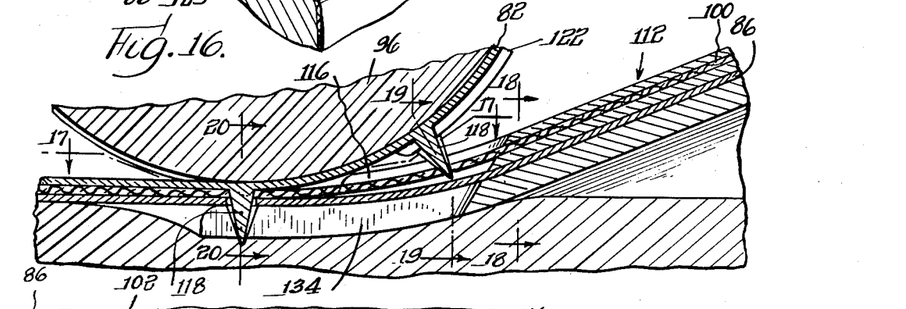
FIG. 16 is a fragmentary cross-sectional view taken along the line 16—16 of FIG. 15.

If desired, the buttons 32 may take the form of pointed studs having constricted necks, as disclosed hereinbelow and illustrated in FIG. 16. Then the tape 28 need not be apertured, and the margins of the strips 18 and 20 need not be stretchable since these margins as well as the tape 28 will then be pierced by the pointed studs.

Further, either of the tapes 28 and 30 may be split lengthwise to separate either the upper and lower rows of studs or buttons 32 or the upper and lower rows of apertures 34 in separate tapes. While the resulting joint is satisfactory, it is not quite as strong or neat as that shown in the drawings.

The tapes 28 and 30 may be made of any suitable material including fabrics, reinforced fabrics, synthetic resins, laminated resins and fabrics, and the like.

Reference is made to FIG. 6 as showing the relationship of the tapes 28 and 30 with the margins of the strips 18 and 20 before these parts are joined together. As shown, the tape 28 carries an upper and a lower row of spaced buttons 32 aligned with similarly arranged apertures 34 in the inner tape 30. The upper rows of spaced buttons 32 and therewith aligned apertures 34 are disposed on opposite sides of the margin of the strip 18, while the lower rows of spaced buttons 32 and apertures 34 aligned therewith are disposed on opposite sides of the margin of the strip 20. By forcing the upper series of buttons or studs 32 through the upper series of apertures 34 the margin of the strip 18 will be secured between the tapes 28 and 30. Similarly, by forcing the lower series of studs 32 through the lower series of apertures 34, the margin of the strip 20 will be secured between the tapes 28 and 30.

Figures 11, 12:
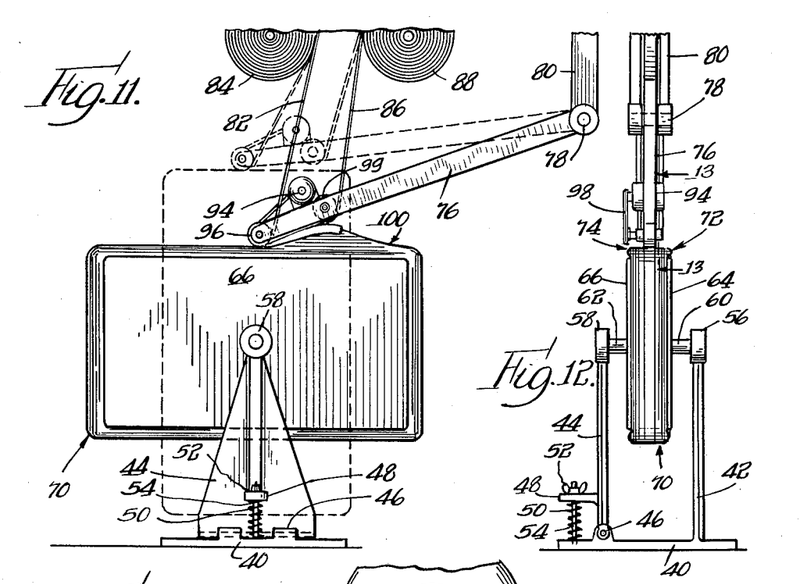
FIG. 11 is a side elevation of a semi-automatic apparatus according to the present invention for making mattresses of the type disclosed hereinabove.
FIG. 12 is an end view of the apparatus of FIG. 11.

Reference is now made to FIGS. 11 and 12 which show apparatus according to the present invention for assembling a cover on a mattress body. This apparatus includes a base 40, a fixed standard 42 projecting upwardly from the base and another standard 44 pivotally connected to the base 40 at 46. The standard 44 is provided with a horizontally projecting arm 48 perforated to receive a rod 50 having a lower end fixed to the base 40 and an upper end threaded to receive a wing nut 52. A coil spring 54 extends around the rod 50 between the base 40 and the arm 48. The rod 44 is swingable around the pivot 46 in the common plane of the bars 42 and 44. The coil spring 54 urges the bar 44 toward the bar 42. The adjustably set wing nut 52 limits the pivoting of the bar 44 towards the bar 42. At their upper ends, the bars 42 and 44 are provided with aligned journals 56 and 58 for aligned, opposed stud shafts 60 and 62 carrying at their ends rectangular plates 64 and 66 adapted to clamp therebetween the broad faces of a mattress body generally indicated at 70 and covered by cover parts indicated generally at 72 and 74 identical with the cover parts 10 and 12 illustrated in FIGS. 1–8. When so mounted between the plates 64 and 66, the mattress 70 may be rotated around its central transverse axis which is aligned with the stud shafts 60 and 62. In FIG. 11, the mattress 70 is shown in full lines in one position of rotation where its major axis extends horizontally and in broken lines in another position of rotation where its major axis extends vertically.

The device of FIGS. 11 and 12 further includes an arm 76 having one end pivotally connected at 78 to a fixed support 80. A tape 82 is supplied from a roll 84 suitably supported or suspended above the mattress 70. Another tape 86 is supplied from a roll 88 suitably supported or suspended above the mattress 70.

Figure 14:
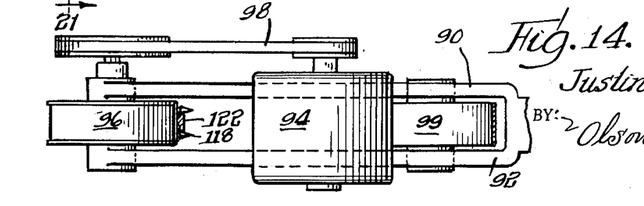
FIG. 14 is a view taken along the line 14—14 of FIG. 13.

As shown in FIG. 14, the free end of the arm 76 is bifurcated, the forked ends being indicated at 90 and 92. An electric motor 94 is supported on the forks 90 and 92 and serves to drive a roller 96 journalled in the free ends of the forks 90 and 92 by means of a belt 98 cooperating with appropriate pulleys on the shafts of the motor 94 and roller 96. Another roller 99 is journalled for free rotation in the forks 90 and 92 near the point of bifurcation.

The tape 82 passes underneath the driven roller 96 and the tape 86 passes underneath the idler roller 99.

The cover parts 72 and 74 include strips 100 and 102 defining sidewalls or boxing and formed at their edges, respectively, with enlarged beads 104 and 106. The strips 100 and 102 are joined to the body sheets of the cover parts 72 and 74 similarly to the cover parts 18 and 20 of FIGS. 1–8.

Figure 13:
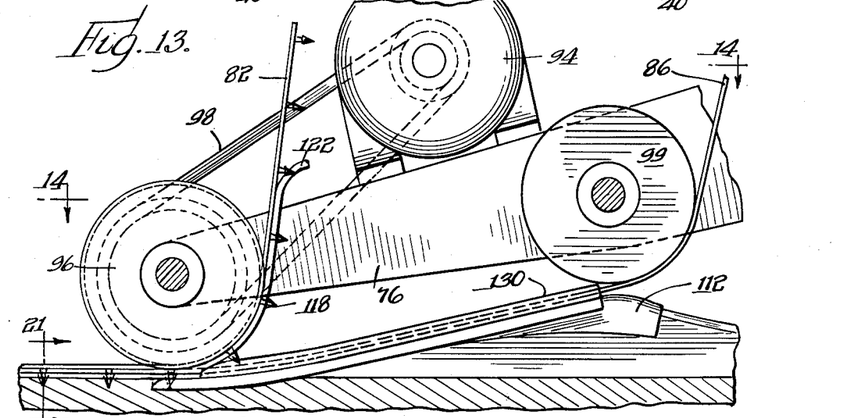
FIG. 13 is an enlarged fragmentary cross-sectional view taken along the line 13—13 of FIG. 12.
Figure 15:
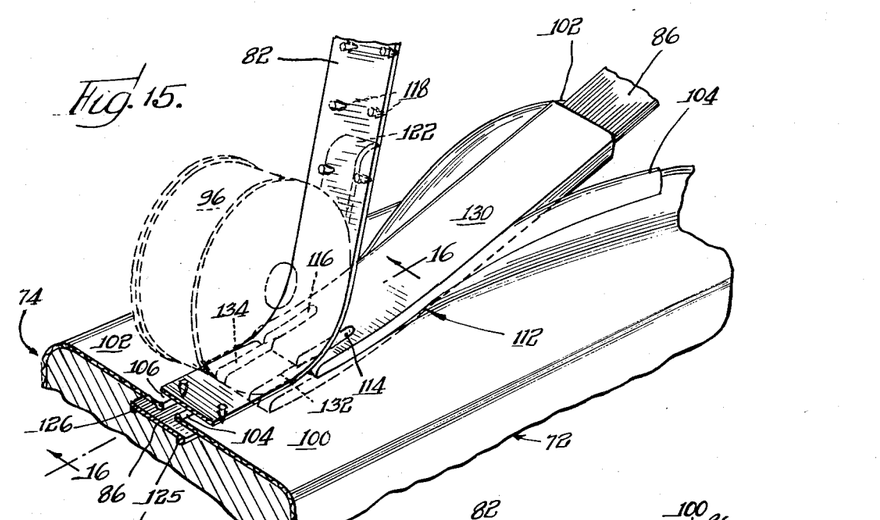
FIG. 15 is a fragmentary perspective view of the device of FIGS. 11–14, with parts broken away, showing the formation of a joint between the two halves of the mattress cover or ticking.
Figure 17:
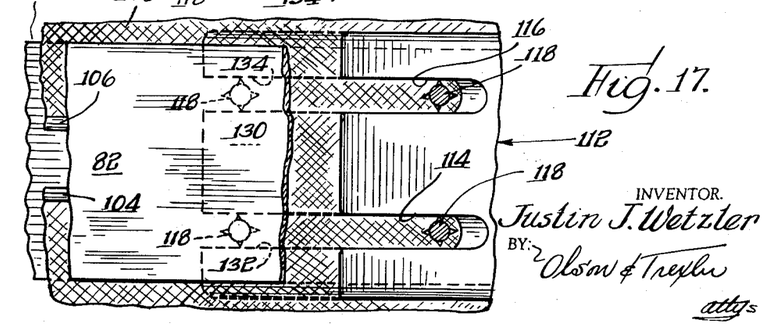
FIG. 17 is a fragmentary cross-sectional view taken along the line 17—17 of FIG. 16.
Figure 18:
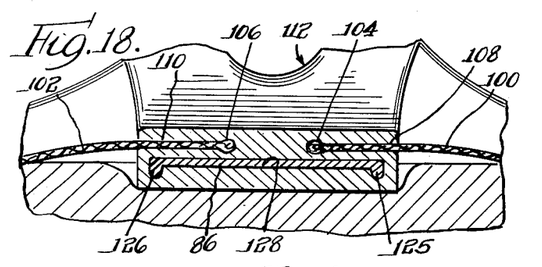
FIG. 18 is a fragmentary cross-sectional view taken along the line 18—18 of FIG. 16.
Figure 19:
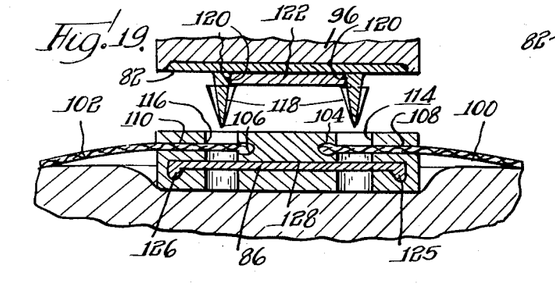
FIG. 19 is a fragmentary cross-sectional view taken along the line 19—19 of FIG. 16.
Figure 20:
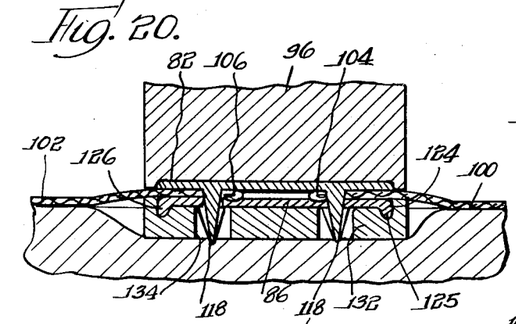
FIG. 20 is a fragmentary cross-sectional view taken along the line 20—20 of FIG. 16.
Figure 21:
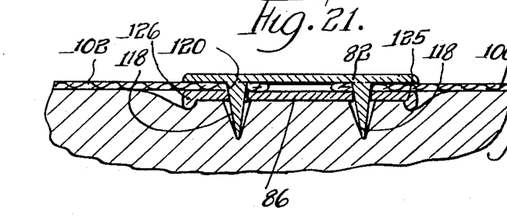
FIG. 21 is a fragmentary cross-sectional view taken along the line 21—21 of FIG. 13.
Figure 22:
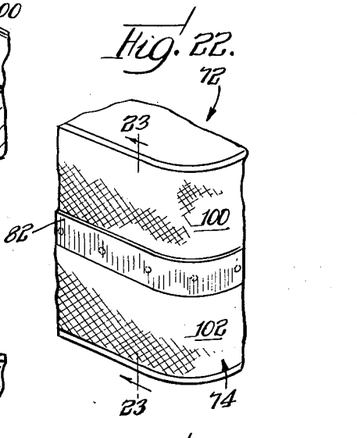
FIG. 22 is a fragmentary perspective view showing a corner of a mattress made by the method and apparatus illustrated in FIGS. 11–21.
Figure 23:
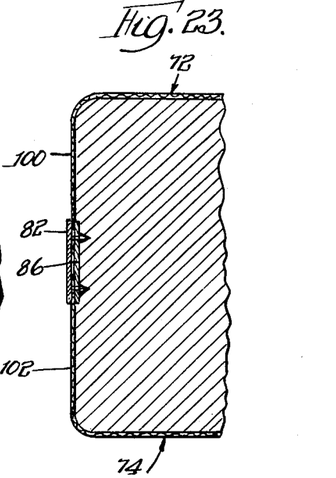
FIG. 23 is a cross-sectional view taken along the line 23—23 of FIG. 22.

The margins of the strips 100 and 102 are threaded through slots 108 and 110 opening at the two edge faces of a flat shoe generally indicated at 112. The bottom of each of the slots 108 and 110 is enlarged, so that when the margins of the strips 100 and 102 are threaded into the slots in question the beads 104 and 106 are received and retained in the enlarged bottom portions of these two slots. The guide or shoe 112 is appropriately and fixedly supported from the forks 90 and 92 of the arm 76 so that, as the mattress 70 is rotated and the margins of the strips 100 and 102 are thereby caused to move through the slots 108 and 110 from left to right as viewed in FIGS. 11 and 13, the margins and the beads 104 and 106 will be properly aligned and spaced from each other by the action of the guide 112. As shown in FIGS. 15 and 18, the slots 108 and 110 in the guide 112 diverge from each other to the right and the guide 112 curves upwardly, so that the right hand portion of the guide 112 (which may be bifurcated) serves to spread apart and lift the margins of the strips 100 and 102 to the right, as viewed in FIGS. 13, 15 and 17, before these margins are brought together in closely spaced opposed relationship, as illustrated at the section line in FIG. 15 and in FIGS. 18–20. At its front end, the guide 112 is formed with vertical axial slots 114 and 116 communicating with the slots 108 and 110 to expose the margins of the strips 100 and 102 adjacent the beads 104 and 106.

The roller 96 contacts the two margins of the strips 100 and 102 immediately to the left of the guide 112. The tape 82 passes under the roller 96 and is thereby interposed between the latter and top margin surfaces of the strips 100 and 102. The tape 82 carries spaced parallel longitudinal rows of studs 118 having restricted necks 120 and pointed end portions formed with axial ribs and hence star-shaped in cross-section. The two rows of studs 118 on the tape 82 are spaced-apart so that the studs will enter the slots 114 and 116 in the guide 112 as the tape 82 passes under the roller 96. The studs 118 are thereby caused to pierce the margins of the strips 100 and 102 inside the beads 104 and 106. To insure proper alignment of the tape 82 with the grooves 114 and 116, the tape may be guided by a shoe 122 projecting upwardly from the guide 112. This shoe is adapted to extend between the studs 118 and to align the studs 118 with the slots 114 and 116 in the guide 112.

The opposed margins of the strips 100 and 102 are joined neatly together by the tape 82 and by the studs 118 projecting therefrom. This joint is made stronger by including therewith the tape 86 disposed below the margins of the strips 100 and 102 and also pierced by the studs 118 of the tape 82. The tape 86 is formed with marginal beads 125 and 126. The guide 112 includes a slot 128 formed in a shoe 130 integral with the shoe 112 and extending below and parallel with the slots 108 and 110. The slot 128 is enlarged at its two sides to receive and retain the beads 125 and 126. To the right, the guide shoe 130 curves upwardly so that the tape 86 can move from below the roller 99 into the open end of the slot 128. The shoe 130 extends to the left past the end of the guide 112 and is formed with slots 132 and 134 aligned with the slots 114 and 116. Thus, the studs 118 of the tape 82 will pierce both the margins of the strips 100 and 102 and also the tape 86 extending below these margins.

It will be noted that the studs 118 of the tape 82 pierce the margins of the strips 100 and 102 while the latter are supported and retained in the slots 108 and 110 of the guide 112. The force required to effect this piercing of the strips 100 and 102 by the studs 118 is exerted by the roller 96. Similarly, the studs 118 of the tape 82 pierce the margins of the tape 86 while the latter is supported and retained in the slot 128 of the shoe 130. Again, the force exerted by the roller 96 effects this piercing. As shown, the strips 100 and 102 are backed up by the guide 112, and the tape 86 is backed up by the shoe 130 when the pressure of the roller 96 forces the studs 118 through the strips 100 and 102 and through the tape 86.

The edge beads 104 and 106 of the strips 100 and 102 and the edge beads 125 and 126 of the tape 86 serve to enable these structures to be guided and retained by the guides 112 and 130 into and in proper position for forming the above noted joint. Further, the beads 104 and 106 and 125 and 126 reinforce the joint, preventing transverse tearing of the strips 100 and 102 and of the tape 86. It is to be noted that the studs 118 pierce the strips 100 and 102 and the tape 86 close to the free margins thereof so that on transverse stressing of the joint the material between the free margins of the strips and/or the tape and the studs would be easily torn if the above noted edge beads were not provided.

If desired, the tape 82 may be suitably reinforced along the lines of attachment thereof of the studs 118.

Winding of the tape 82 with studs 118 attached in the form of a supply roll 84 has been found to produce a bulky supply roll that is awkward and inconvenient to handle and utilize. Accordingly, it has proved advantageous to affix the studs 118 to the tape 82 immediately prior to the assembly of the tape 82 by the means including roller 96 and guide 112; and turning now to FIGS. 24–29, the means for affixing the studs 118 to the tape 82 will be seen to include an idler roller 140 which conducts the tape 82 from supply roll 84 toward a stud-affixing mechanism indicated generally by the numeral 142.

Figures 25, 26:
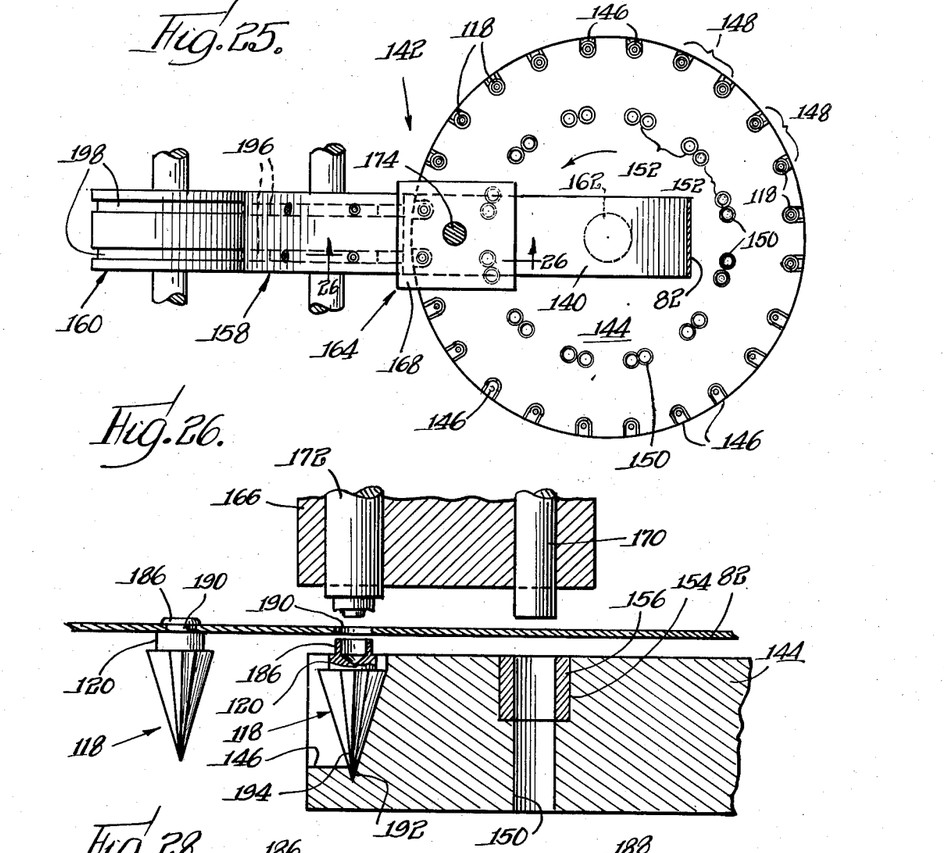
FIG. 25 is a view taken through the section 25—25 of FIG. 24.
FIG. 26 is an enlarged view taken through the section 26—26 of FIG. 25.

With particular reference to FIG. 25, the stud-affixing mechanism 142 will be seen to include an indexing wheel 144 which is provided with peripheral, radially outwardly and axially upwardly opening recesses 146, the recesses 146 being arranged in arcuately spaced pairs 148. The spacing between the individual recesses 146 in each of the pairs 148 is arranged to correspond with the transverse spacing between the studs 118 in their attached condition relative to the tape 82. Each of the recesses 146 is arranged to receive and supportably retain a stud 118 prior to the affixing of the stud to the tape 82; and in compliance with the invention, the loose studs 118 are appropriately positioned in the recesses 146 manually, by an automatically operating stud-feeding device, or by other suitable means.

The indexing wheel 144 also is provided with a number of axially extending bores 150 spaced radially inwardly from the recesses 146 by a distance corresponding with the longitudinal spacing of studs 118 in their as-affixed condition, there being the same number of bores 150 that there are recesses 146. The bores 150 are arranged in pairs 152 corresponding with the pairs of recesses 146, the individual bores 150 in each of the pairs 152 being spaced from the other bore in the pair by the same chordal distance that separates the recesses 146 in a pair 148. Each of the bores 150 is arranged with a counterbore 154, as is shown in FIG. 26; and a die 156 is inserted fixedly in this counterbore for purposes which will become apparent hereinafter.

The tape 82 is drawn diametrically over the surface of indexing wheel 144 and is spaced slightly thereabove by means of a drive roller 158 and a cooperating back-up roller 160. The indexing wheel 144 is mounted to a shaft 162 to be rotated in arcuate increments or stepped to position successive pairs of the recesses 146 and of the bores 150 beneath the tape 82. Advantageously, the drive roller 158 is synchronized with the stepping of wheel 144 to move the tape 82 a distance corresponding with the longitudinal spacing of the studs 118 in their attached condition relative to the tape 82 each time that the stepping of wheel 144 moves to place a fresh pair of studs 118 beneath the tape 82.

Figures 24, 27:
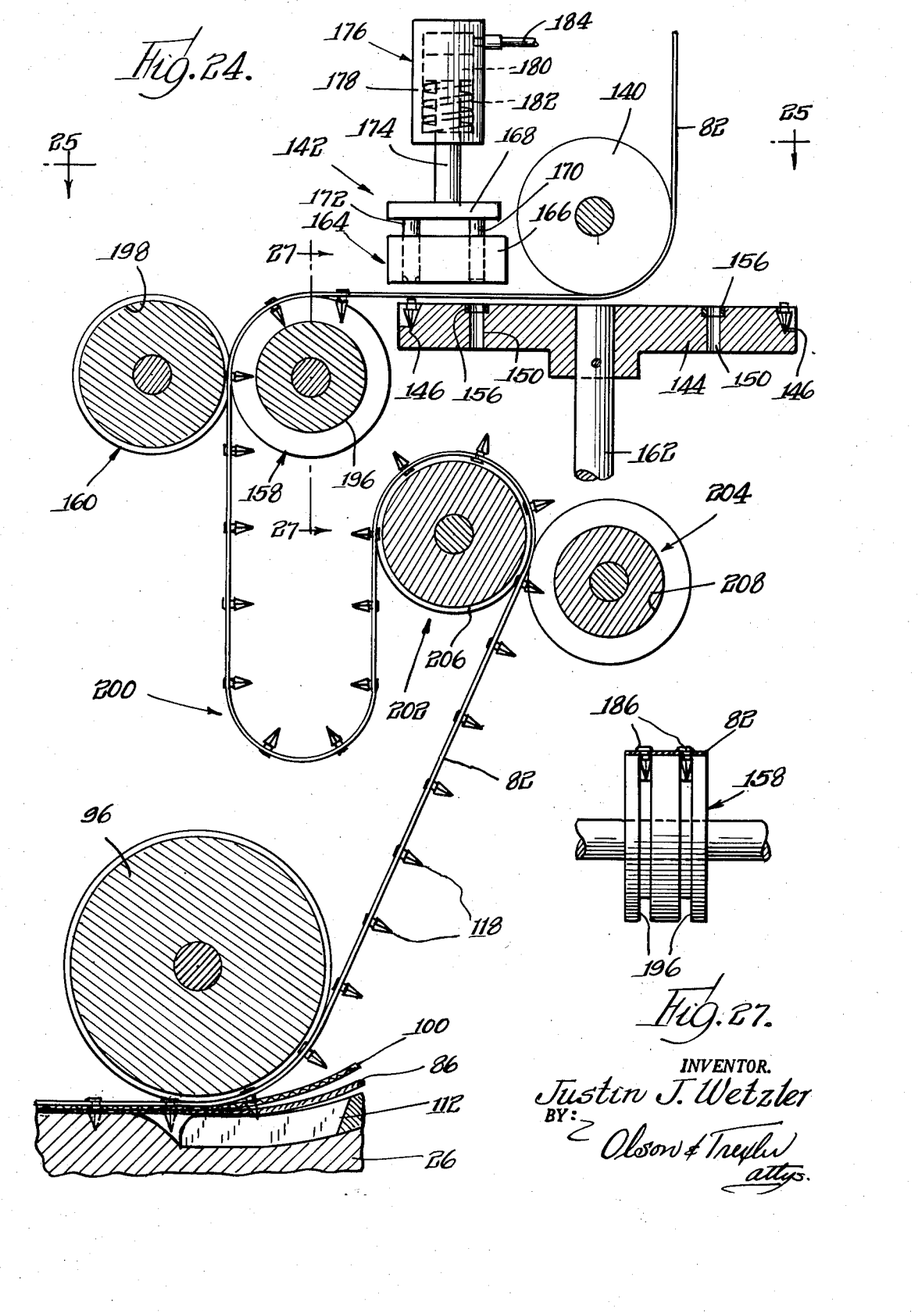
FIG. 24 is a side elevational view of a modified form of the apparatus of FIGS. 11–14, showing attachment of the studs to the outer joining tape immediately prior to assembling of the tape to the mattress structure.
FIG. 27 is a view taken through the section 27—27 of FIG. 24.

The stud-affixing mechanism 142 also includes a press device shown generally at 164, press device 164 comprising a stationary guide element 166 and a reciprocable platen 168. With particular reference to FIGS. 24 and 26, the platen 168 will be seen to have affixed thereto in depending relationship a punching tool 170 and a riveting tool 172 spaced from each other along a radius of wheel 144. The tools 170 and 172 are arranged to pass freely through cooperating bores fashioned in the guide element 166. A rod 174 is also affixed to platen 168 in upstanding relationship in order to implement reciprocable movement of the platen 168 by means of the hydraulic jack indicated generally by the numberal 176. The hydraulic jack 176 is suitably synchronized with the stepping movement of indexing wheel 144 and the cooperating rotation of drive roller 158, hydraulic jack 176 comprising a cylinder 178, a piston 180 connected to the rod 174, a compression spring biasing member 182 and an inlet hydraulic fluid line 184.

Figure 28:
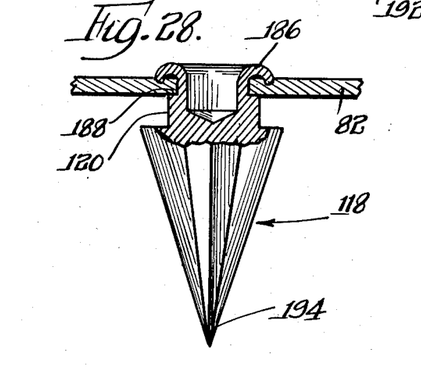
FIG. 28 is an enlarged view in partial cross-section showing the stud affixed to the outer tape.
Figure 29:
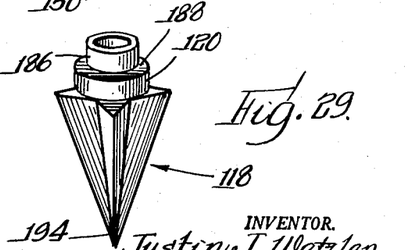
FIG. 29 is a perspective view of the stud shown in FIG. 28.

Considering for the moment FIGS. 28 and 29, a stud 118 will be seen to include a shank portion 120 as has been described. Stud 118 also includes a hollow cylindrical head portion 186 of smaller diameter than the shank portion 120 whereby to define a shoulder 188. As is best shown in FIG. 28, the sidewalls of head portion 186 are arranged to be formed over in the manner of an eyelet or rivet to trap a portion of the tape 82 between shoulder 188 and the formed over portion of head 186. Advantageously, this attachment of a stud 118 to the tape 82 is achieved by the press device 164; and turning to FIG. 26, the punching tool 170 will be seen aligned over a bore 150 in position to cooperate with a die 156 in cutting or punching out a hole from the tape 82. One such hole is shown at 190 in FIG. 26 where the hole is shown aligned over a stud 118. It is to be noted that the hole 190 is of sufficient diameter to pass easily over the unformed head 186 of stud 118 but is not sufficiently large to slip over the shoulder 188 onto the shank portion 120.

Continuing with reference to FIG. 26, the loose stud 118 will be seen supported in an upright position in the recess 146, as by a cooperatively shaped, vertically downwardly extending notch 192 receiving the tip 194 of the stud. When a hole 190 is aligned over the head 186 of a stud 118 supported in a recess 146, a downward stroke of the riveting tool 172 is able to position the tape 82 over the head 186 and expand the upper edge of the head 186 trapping the tape 82 between the shoulder 188 and the formed edge of head 186. In operation, the punching tool 170 and the riveting tool 172 will be operated simultaneously to affix a stud 118 to the tape 82 and punch a hole 190 in the immediately preceding portion of the tape drawing the tape 82 downwardly into contact with wheel 144. Thereafter and as the tools 170 and 172 are retracted, the resiliency in the tape 82 cooperating with the spacing of the tape 82 above the indexing wheel 144 will lift the tip 194 of the stud out of the notch 192, freeing the stud from the recess 146.

Drive roller 158 will then advance the tape 82 positioning the previously formed hole 190 over a newly positioned recess 146 carrying a fresh stud 118. It is to be noted that the spacing of tape 82 above the indexing wheel 144 establishes clearance between the tape and the top of an unformed head 186 thereby permitting free passage of the tape relative to the heads 186 upstanding from the surface of wheel 144 except when the tools 170 and 172 are actively operated.

When the studs 118 have been affixed to the tape 82, the formed-over heads 186 extend slightly from one side of the tape 82 and the shank portions 120 with the spearheaded portions of the stud extending from the other side of the tape 82. Because of this arrangement, it has proved desirable to provide drive roller 158 with peripheral grooves 196 for receiving the shank and spear-headed portions of the studs 118 as is shown in FIG. 27. Correspondingly, the back-up roller 160 is provided with somewhat shallower grooves 198 to accommodate the formed-over heads 186.

It is to be recognized that the roller 96 is continuously operated whereas drive roller 158 and back-up roller 160 are intermittently operated in cooperation with the stepping of indexing wheel 144. Accordingly, it has proved advantageous to develop a timing loop 200 in the tape 82 between drive roller 158 and roller 96, the loop 200 accommodating the incremental movement of tape 82 to the punching and riveting station without interference with the continuous operation of roller 96.

In order to keep loop 200 slack while permitting a certain amount of tension to be applied in the tape 82 as it is being acted on by the roller 96, there is provided a drive roller 202 and a cooperating back-up roller 204. Roller 202 is continuously driven in synchronism with roller 96 whereas roller 204 is an idler roller. In order to accommodate the studs 118, roller 202 is fashioned with grooves 206 similar to the grooves 198 in roller 160. Likewise, roller 204 is fashioned with grooves 208 similar to the grooves 196 in roller 158.

Many details may be varied without departing from the principles of this invention; and it is, therefore, not my intention to limit the patent granted on this invention otherwise than necessitated by the scope of the appended claims.

The invention is claimed as follows:

1. Apparatus for enclosing a mattress body within a mattress cover wherein said mattress cover includes two body sheets having marginal strips, the marginal strips of said body sheets jointly defining a sidewall for said cover, said cover further including a first tape underlapping the edges of said strips, a second tape overlapping the edges of said strips, and holding means passing through the edges of said strips for securing said tapes together, said apparatus comprising: a plurality of guide means individually movable with respect to said mattress body and said cover and jointly operable to dispose and hold said marginal strips in opposed relationship, to dispose and hold said first tape in underlapping relationship relative to said marginal strips and to dispose and hold said second tape in overlapping relationship relative to said marginal strips; and means for urging said holding means through said marginal strips and through said first tape.

2. Apparatus according to claim 1 further comprising means for affecting relative movement between said guide means and said mattress cover and body.

3. Apparatus according to claim 1 wherein the edge of each of said marginal strips incorporates a reinforcing bead; wherein said second tape is provided with reinforcing beads at its edges; and wherein said guide means includes a plurality of members each defining a slot having an enlarged bottom portion adapted to receive and retain one of said reinforcing beads.

4. Apparatus according to claim 1 wherein said holding means are studs and wherein said guide means includes a guide shoe adapted to receive said second tape, said shoe being of such width as to permit said studs to project laterally therebeyond.

5. Apparatus according to claim 1 wherein said holding means are studs and wherein said apparatus further comprises means affixing said studs to said second tape immediately prior to assembly of said second tape with said marginal strips, said means for affixing said studs including reciprocably operable stud attachment means, incrementally operable tape transport means stepping said second tape through said stud attachment means, and continuously operable tape transport means defining a timing loop in said tape between said first tape transport means and said means for urging said studs through said marginal strips and through said first tape.

6. Apparatus according to claim 3 wherein the slot-defining members cooperating with said marginal strips are disposed initially to space said marginal strips further apart and thereafter closer together as said strips pass through said slots.

7. Apparatus according to claim 3 in which said slot-defining members are apertured lengthwise to admit said studs therethrough.

8. The method of enclosing a mattress body within a cover which is characterized by the steps of: providing upper and lower cover parts, each including a body sheet and a marginal strip, said marginal strips jointly defining a sidewall for said cover; disposing said cover parts respectively over the top and bottom surfaces of said mattress body with the free edges of said strips opposed to each other; extracting a first tape from a coil and disposing it to underlie the free edges of said strips; extracting a second tape from a coil and disposing it to overlap the free edges of said strips; affixing studs to said second tape after uncoiling and immediately prior to assembling said second tape to overlap the free edges of said strips; and joining said tapes together by urging said studs through said marginal strips and through said first tape.

9. A method according to claim 8 which is further characterized by the step of providing the edges of said marginal strips and the edges of said first tape with reinforcing beads.

References Cited in the file of this patent

UNITED STATES PATENTS

| | | |
|---|---|---|
| 2,738,093 | Derby et al. | Mar. 13, 1956 |
| 2,973,526 | Wetzler | Mar. 7, 1961 |